United States Patent [19]

Hinderks

[11] 4,009,622
[45] Mar. 1, 1977

[54] COLLAPSIBLE MEMBER

[76] Inventor: Mitja Victor Hinderks, 15a Adamson Road, London, England, NW3

[22] Filed: Oct. 28, 1975

[21] Appl. No.: 626,535

[52] U.S. Cl. .................................. 74/492; 169/57; 169/58; 169/62; 188/1 C; 280/87 C

[51] Int. Cl.² .................. B62D 1/18; A62C 35/12

[58] Field of Search ............ 74/492, 493; 188/1 C; 180/82 R; 280/87 C; 293/1; 169/57, 58, 62

[56] References Cited

UNITED STATES PATENTS

| | | | |
|---|---|---|---|
| 1,668,940 | 5/1928 | Burke, Jr. | 169/62 X |
| 1,745,909 | 2/1930 | Paulus et al. | 169/58 |
| 1,844,056 | 2/1932 | Bronander | 169/62 X |
| 3,528,530 | 9/1970 | Franck et al. | 74/492 X |
| 3,572,465 | 3/1971 | Olson | 188/1 C |
| 3,588,158 | 6/1971 | Ford | 293/1 |
| 3,621,732 | 11/1971 | Kaniut | 74/492 |
| 3,699,624 | 10/1972 | DeGain | 74/492 X |
| 3,805,636 | 4/1974 | Howes | 74/492 |

Primary Examiner—Allan D. Herrmann
Attorney, Agent, or Firm—Wigman & Cohen

[57] ABSTRACT

The invention relates to a structural member which is capable of progressive collapse through and to at least party predetermined forms, and which may optionally incorporate function(s) other than structural member/load absorber. In preferred embodiments the alternative functions are related to safety and protection. Two of the significant features of the invention relate to constructing the member of forms of broadly conical configuration, and that the alternative function shall be that of fire extinguisher.

9 Claims, 16 Drawing Figures

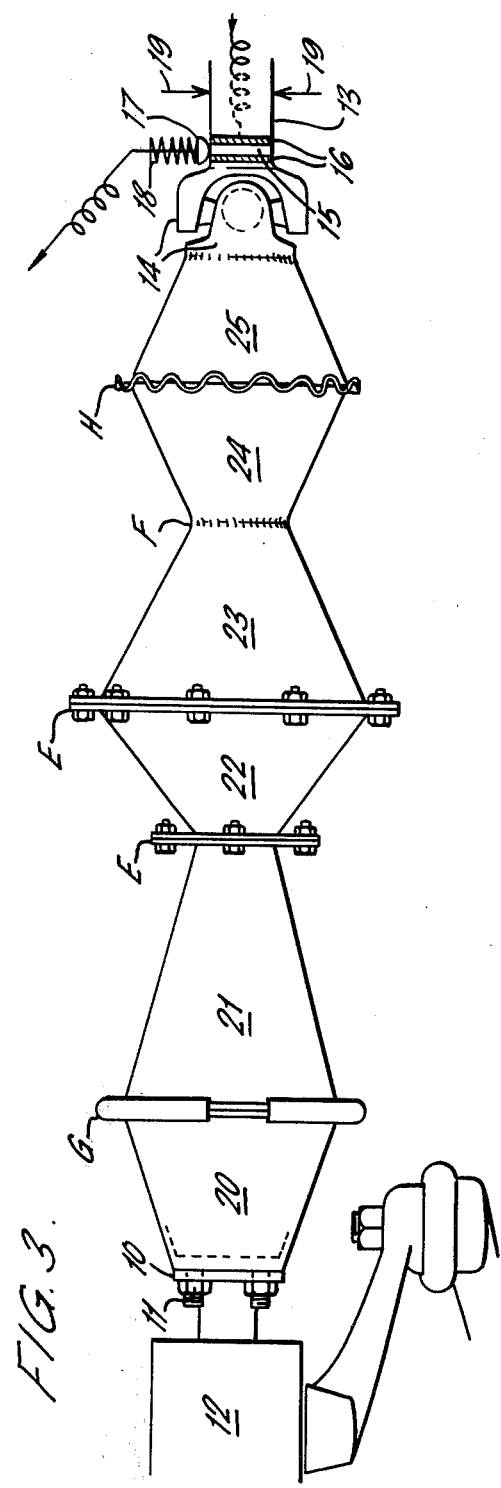
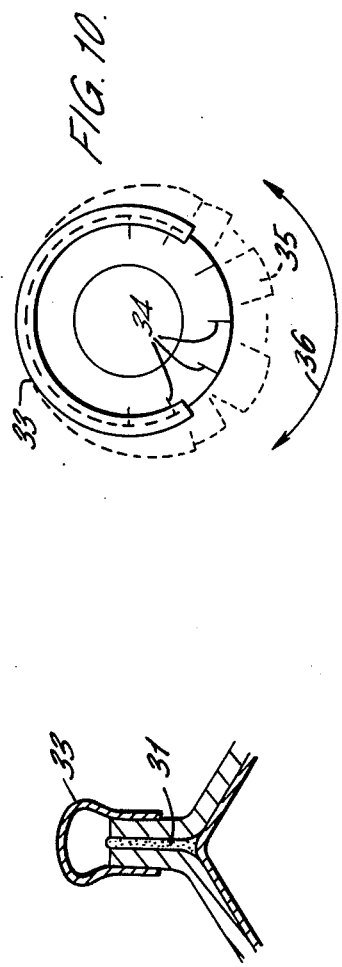

COLLAPSIBLE MEMBER

The invention relates to a structural member which is capable of progressive collapse through and to at least partly predetermined forms, and which may optionally incorporate function(s) other than structural member/load absorber. In preferred embodiments the alternative functions are related to safety and protection. Two of the significant features of the invention relate to constructing the member of forms of broadly conical configuration, and that the alternative function shall be that of fire extinguisher.

Although the invention relates to collapsible members in general, it is considered especially suitable for incorporation in motor vehicles especially as a steering column. In a front engined car the provision of the invention as steering column having additional function as fire extinguisher, preferably so arranged as to function in the latter manner on collapse of the column, i.e. when the vehicle suffers a frontal impact. It is assumed that here column and engine systems will usually share a common compartment. As will be more fully described in later sections, the column may be so constructed as to be collapsible to up to one tenth of its original length, so if used as a steering column would be preferable to those column systems which collapse to a greater percentage of their original length. Once incorporated in a vehicle or other place, the column of the invention may fulfill any function whatever, including for example, a fluid reservoir, dampener of rotational or other movement, shock absorber. The column would be especially desirable in a competion vehicles such as a sports, rally or racing car, where on collapse of the column a fire extinguisher is directly or indirectly actuated. The collapsible member in such case can be any structural or functional portion of the vehicle, including steering column.

It has been mentioned that the column may be used as an improved type of vehicle steering column, since it is capable of a greater ratio of collapse than conventional arrangements. When used as a steering column it may optionally also act as a reservoir, to contain various substances including: (a) a gas or liquid under pressure, used to serve ancillary functions in the vehicle or to propel it under certain driving modes. For example it may contain compressed air which is part of a vehicle braking system, or which is part of an energy recycling system. For example the air may be produced under certain driving modes such as braking, stored in compressed form in the column (which then acts as an accumulator) to be used again at another time to propel the vehicle and/or ancillary systems under certain conditions. (b) The invention may also contain water, whether warm, such as when the column forms part of a vehicle cooling system, or cold, when the column may be used as an emergency water contains, say in army trucks. Instead of water special engine cooling fluids may be contained in the column, including those used in today's sealed cooling systems. (c) It may also contain oil or other lubricating material, either as emergency supplies or as part of the vehicle lubricating system, say replacing the sump reservoir. (d) It may also contain fuel, such as petrol, either as an emergency supply or for preheating. In such case the column should preferably not be in the engine compartment of the vehicle. (e) It may also contain working fluid associated with a vehicle air conditioning system.

If filled with a fluid which will be stored at higher or lower temperature than ambient atmosphere, the column may be used as a heat exchanger, being optionally provided with internal or external heat dispersal flanges or fins. If filled with a liquid, and especially if radial type internal flanges are fitted, the column if rotatable may act as a rotational dampener, if a steering column, as a steering dampener. When used as a positive safety device, the column may be part of the steering system or be placed anywhere in the vehicle. On collision the column would collapse and be so designed that in the process it would rupture to release fluid contained within it, including for example fire fighting foam and/or inert gas. Any or all of these different uses may be combined in another. Additionally the column may be used to control progression of collapse.

The invention comprises a collapsible structural member which is in the form of a series of hollow partial cones placed end to end, either directly or separated by intermembers. The column is arranged in such a way that sufficient compression load on it will tend to cause preferably the outer diameter of at least one cone to split so that the walls of the cone tear and divide into partly separated sections. The column may be integral construction, with a deliberate structural weakening built into part of the regions defining or between the conical forms, or it may be constructed of prefabricated partly conical forms affixed to one another. The interior volume of the column may at least partly be used for non structural purposes.

The invention further comprises any vehicle steering column, simultaneously functioning as a fire extinguisher and/or fluid reservoir wherein for example the fluid may be fire fighting material, oil, water, refrigerant, etc. The invention further comprises the column of the invention used in a vehicle not as a steering column, but where is at least partly acts as a reservoir. The invention further consists in using the column of the invention as a shock absorber, as a dampener of rotational movement and/or a means of control of direction of movement or collapse.

The following diagrams illustrate by way of example embodiments of the invention.

FIG. 3 shows a vehicle steering column.

FIGS. 7 to 10 and 16 show constructional details of various types of column.

Figure 1:
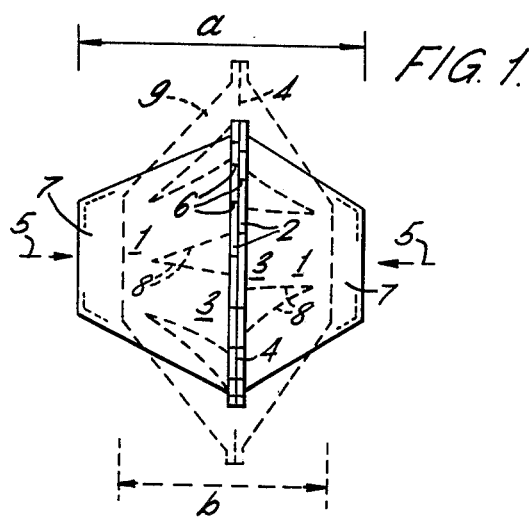
FIG. 1 and 2 illustrate diagrammatically a basic principle of the invention.
Figure 2:
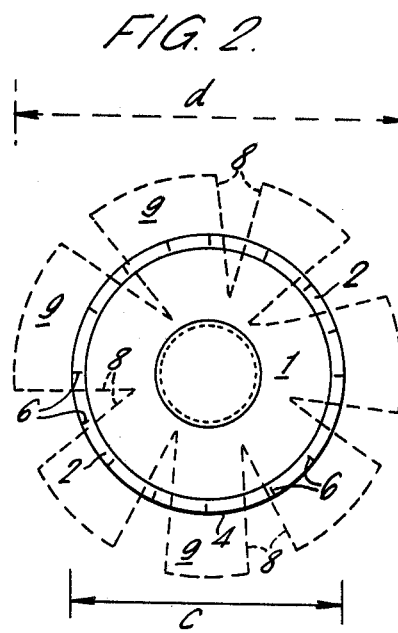

Side elevation FIG. 1 and sectional elevation FIG. 2 illustrate the basic principle of the collapsible column, shown before deformation in solid line and after deformation in dotted line. Truncated hollow cones 1 having at least at wide end 3 a flange 2 with minature periferal cuts 6 a are joined flanges abutting at 4. On sufficient compression loads 5 being applied to the narrow end 7, tears 8 will commence at the cuts and progress along the cone until it is split into sections or shreds 9. This will result in the increase of effective diameter from dimension $c$ to $d$ and the decrease of overall length from $a$ to $b$.

The principles described above can be incorporated in a column or other structural member in any way. By way of example there is shown diagrammatically in FIG. 3 a motor vehicle steering column of composite construction made up of the conical forms of invention, affixed at one end to the steering box 12 by means of abutting flanges 10 connected by bolts 11, at the other end to a stub column 13 connected to steering wheel (not shown) by means of universal joint 14 say to take up flexing between cab and chassis. Here the horn line sometimes running through conventional columns has been eliminated, alternative horn signal transmission being achieved by means of conductor ring 15 set in insulation 16 communicating with spring 18 loaded brush 17. Bearing supporting stub column and supported in the vehicle scuttle are indicated diagrammatically at 19.

Figure 4:
FIGS. 4 to 6 show alternative configurations of collapsible column.
Figure 5:
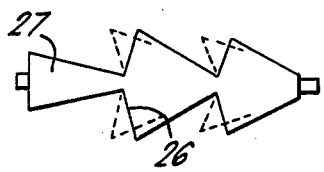
Figure 6:
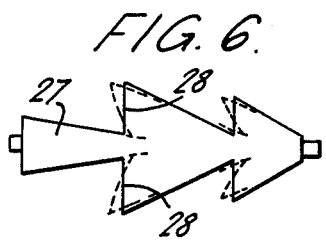

The hollow conical forms in the above embodiment are of varying diameters and length, it being an object of the invention to easily contruct a column to suit the requirements of any vehicle from a selection of standard conical forms. It will be obvious that for a given length, thickness of material and degree of periferal notching, a steep sided cone such as at 22 will tend to collapse more easily than a shallow sided one at 21. Equally apparent, a long cone will collapse more easily than a short one of same angle, small diameter and thickness of material. Elements of varying configuration may be assembled to provide a column (not necessairly a steering column) of the desired length, of the desired strength before deformation occurs, absorbing a desired amount of energy during deformation and tearing or collapsing first at a specific location in the column. The elements may be assembled in any sequence or manner, being for example connected by means of flanges and bolts along joint E, by butt welding at F and by special means described later at G and H. The column of 20 through 25 is pre-assembled before fitment to the vehicle, either by addition of units such pre-constructed units 20/21 sealed to contain fluid, and/or pre-constructed unit 23/24 (which may alternatively be of integral construction) or by assembly of single units such as 22 or 25. The conical forms have been indicated as having small nicks or cuts along their edges, these incisions growing to full-scale tears during collapse. The cuts may be omitted, since tearing and splitting is most likely deformation of the forms under excess load. FIGS. 4 to 6 show diagrammatically alternative embodiments of the invention, wherein the conical forms are arranged in ways alternatively to FIG. 3. FIG. 4 shows shallow cones 26 codirectional with sharper cones 27, similar cones being arranged in opposing directions in FIG. 5. FIG. 6 shows cones spaced by discs 28, within each figure the position of cones relative to each other on collapse indicated by dotted lines. With these embodiments, loadings during initial collapse will cause a greater amount of bending, deflection and shearing, with tearing (if any) occurring during later stages of collapse. The columns of FIGS. 4 to 6 will generally not be able to collapse to as small a percentage of orignal length as that of FIG. 3.

Figure 7:
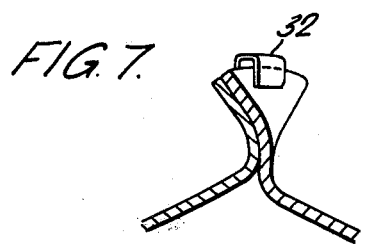
Figure 8:
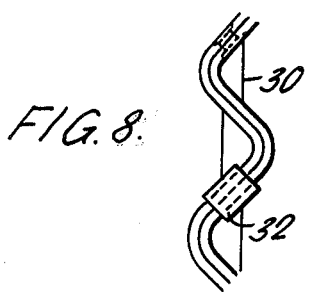
Figure 11:
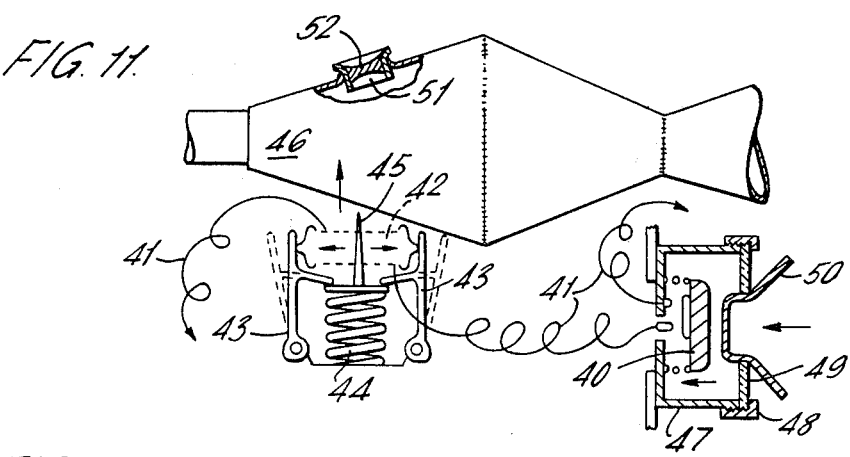
FIG. 11 shows means of actuating fire extinguisher portion of column.

The manner of joining of the cones will considerably affect the performance of the column. FIGS. 7 and 8 show in part section and part elevation respectively an enlargement of H in FIG. 3, wherein the flanges are crimped, pressed, twisted into "three-dimensional" forms so as to better impart torsional loads from one conical section to another. Fixing means include spot welding 30, adhesives 31, and/or clamping clips 32. FIGS. 9 and 10 show in detail section and elevational cross-secton respectively fixing by means of clamping rings(s) 33 and adhesive and/or sealant 31. The clamp ring 33 may be fitted around the entire circumference of the joint either wholly or in sections, or may only be fitted around part of joint as in FIG. 10, wherein nicks or cuts 34 are partly provided in the abutting flanges. On collapse the arrangement will take the form shown dotted at 35, resulting in rupture and tearing first occurring at the predetermined region 36. Such arrangements are suitable for incorporation in a column where it is to be used as a fire extinguisher. Any fluid inside the column would on its collapse be expelled in a desired direction. Joins between sections may be of any construction and form.

Where the column is used as a fire extinguisher in a vehicle it may be actuated by means other than the collapse of the column. It may be actuated by the driver or operator as illustrated diagrammatically in FIG. 11 by way of example. When switch 40 is pressed an electrical circuit 41 is completed which activates a solenoid 42 which in turn frees clamps 43 to free powerful compression spring 44 on front of which is affixed spike 45 to puncture wall of column 46. The drivers switch may be mounted in a housing 47 covered by a screw cap consisting of a ring element 48 in which is mounted a thin glass disc 49 the middle of which contains a recessed bucket-shaped ductile material finger push 50. Although the glass would need to be broken to activate the extinguisher, the activting digit would be protected. Alternatively or additionally, the extinguisher could be activated automatically by the ambient temperature rising above a predetermined level. For example a plug 51 could be provided in the column containing a material 52 which would melt above a selected temperature. In a preferred embodiment a sporting or competition vehicle has the column of the invention as fire extinguisher, activated either automatically by the temperature rise, or optionally by the driver, or on collapse of the column.

Figure 12:
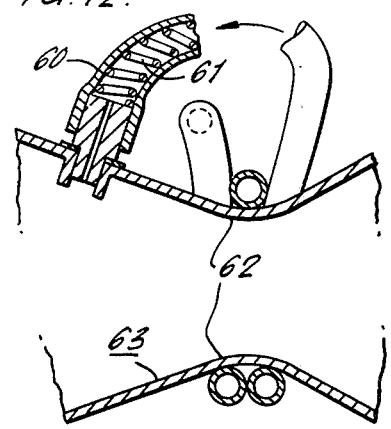
FIGS. 12 to 14 show constructional details of fluid reservoir portion of column.
Figure 14:
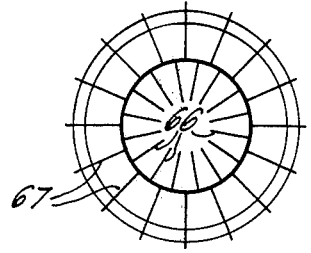
Figure 13:
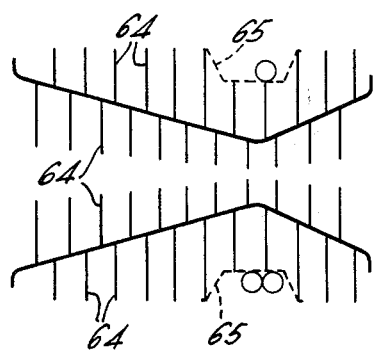

All or part of the interior of the column when mounted in any vehicle may be used as a reservoir to contain fire fighting fluid, fluid under pressure which is part of the vehicles hydraulic system, hot or cold fluid which is part of an engine cooling or air conditioning system, fluid which is part of a vehicle's lubrication or fuel system. Connection to the column may be by spring 61 mounted flexible hose 60 capable of rolling itself about a waist 62 in column 63 if it is capable of rotational motion, as illustrated in part section FIG. 12. Part section FIG. 13 shows a column having an interior used as a reservoir for fluid for which cooling is desired, and which is therefore fitted with heat conducting fins or flanges 64. A hose coiling mesh tray 65, is mounted over the external fins. When the column is a liquid reservoir and steering column combined, the provision of internal flanges 66 as shown in diagrammatic cross-section FIG. 14, wherein external heat dissipation fins 67 are also provided, means that the assembly can also function as a steering damper, since rotation motion of the column will be resisted by the inertia of the mass of liquid.

Figure 15:
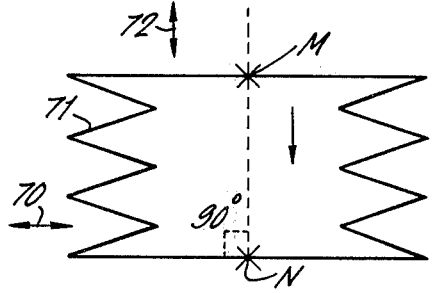
FIG. 15 illustrates the use of the column to control direction of movement.

Because collapse of the column is clearly energy absorbing, the column may be used in any situation as a shock, load or energy absorber, including in combination as a fire extinguisher. The column may also be used as a means for controlling direction of collapse reasonably accurately, as illustrated by way of example in FIG. 15. It can be seen that a column 71 of such a construction could provide great resistance to lateral loads 70 and relatively light resistance to vertical loads 72. If this differential were made large enough point M could be made to align more or less perpendicularly with point N through the collapse of the column.

Figure 16:
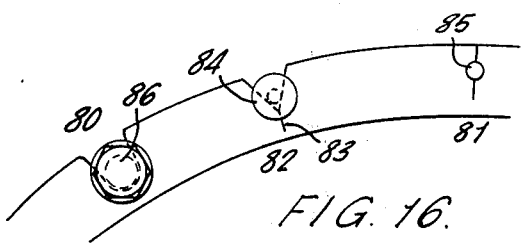

A further means of attaching conical sections to make up a column, especially in the above applications is illustrated diagrammatically in part sectional elevation FIG. 16, wherein conventional fasteners are fixed at breaks in the perifery of the abutting flanges. At 80 is shown a V-shped notch seating a bolt 86, at 81 a rivet 85, driven through a slit and at 82 a flat head rivet 84 clamping across a V-shaped notch having a short slit 83 running on from the apex of the V.

The forms of the invention may be fabricated in any suitable material, including metals, plastics etc, and by any suitable means. In preferred embodimens, the conical shape is formed by forcing a cylinder on a conical former, so that the wider end of the resultant cone is stretched and of progressively lesser thickness than the base or narrow end. Such variation of thickness in some cases is a desirable feature, since the portion of the assembly where collapse in those cases is intended to commence has the thinnest walls and is therefore weakest.

The various features of the invention described above may be embodied in any combination. The column of the invention may be used in any situation and for any purpose.

What I claim is:

1. A collapsible structural member for absorbing loads, comprising a plurality of generally truncated conical members substantially coaxially arranged in end-to-end relation, said structural member having a first predetermined length, at least one of said conical members including means facilitating the splitting of a portion of the conical surface of said at least one conical member upon application thereto of a predetermined, substantially axial load to thereby collapse said structural member to a second predetermined length.

2. A structural member according to claim 1 wherein adjacently situated conical members are arranged with oppositely oriented apices.

3. A structural member according to claim 1 wherein said means facilitating splitting comprises a plurality of peripheral cuts in the conical surfaces of said conical members.

4. A structural member according to claim 1 wherein said structural member comprises a vehicle steering column.

5. A structural member according to claim 4 wherein said conical members are of hollow construction, and are sealingly interconnected to form a fluid reservoir.

6. A structural member according to claim 5 wherein the fluid reservoir of said vehicle steering column is adapted to contain a fire extinguishing fluid whereby, upon splitting of said at least one conical member in repsonse to said predetermined load, the fire extinguishing fluid is distributed to the interior of a passenger compartment of a vehicle provided with said steering column.

7. A structural member according to claim 5 wherein the fluid reservoir of said vehicle steering column is adapted to contain a fire extinguishing fluid and including means for rupturing said fluid reservoir to distribute the fire extinguishing fluid to the interior of a passenger compartment to a vehicle provided with said steering column.

8. A structural member according to claim 7 wherein said rupturing means comprises a spike arranged adjacent one of said conical members and means operatively connected to said spike for selectively urging the same penetratingly into said one conical member.

9. A structural member according to claim 7 wherein said rupturing means comprises plug means arranged in a wall of one of said conical members, said plug means including a material which melts above a predetermined temperature.

* * * * *